United States Patent
Nakano et al.

(10) Patent No.: US 10,442,942 B2
(45) Date of Patent: Oct. 15, 2019

(54) RADIATION-CURABLE INK JET COMPOSITION AND INK JET PRINTING METHOD

(71) Applicant: Seiko Epson Corporation, Tokyo (JP)

(72) Inventors: Keitaro Nakano, Matsumoto (JP); Toshiyuki Yoda, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/635,641

(22) Filed: Jun. 28, 2017

(65) Prior Publication Data

US 2018/0002552 A1 Jan. 4, 2018

(30) Foreign Application Priority Data

Jun. 29, 2016 (JP) ................................ 2016-128884
Apr. 5, 2017 (JP) ................................ 2017-075087

(51) Int. Cl.
| | |
|---|---|
| *B41J 2/01* | (2006.01) |
| *C09D 11/101* | (2014.01) |
| *B41J 11/00* | (2006.01) |
| *C09D 11/30* | (2014.01) |
| *C09D 11/322* | (2014.01) |
| *C09D 11/324* | (2014.01) |

(52) U.S. Cl.
CPC ............ *C09D 11/101* (2013.01); *B41J 2/01* (2013.01); *B41J 11/002* (2013.01); *C09D 11/30* (2013.01); *C09D 11/322* (2013.01); *C09D 11/324* (2013.01)

(58) Field of Classification Search
None
See application file for complete search history.

(56) References Cited

U.S. PATENT DOCUMENTS

| | | | | |
|---|---|---|---|---|
| 2013/0010039 A1* | 1/2013 | Kida | ................... | C09D 11/101 347/100 |
| 2013/0050366 A1* | 2/2013 | Sasada | ................ | C09D 11/101 347/100 |
| 2013/0260092 A1 | 10/2013 | Araki et al. | | |
| 2013/0295342 A1* | 11/2013 | Araki | .................. | C09D 11/101 428/195.1 |

FOREIGN PATENT DOCUMENTS

| | | |
|---|---|---|
| EP | 2644664 A1 | 10/2013 |
| JP | 2013-227515 A | 11/2013 |

\* cited by examiner

*Primary Examiner* — Erica S Lin
(74) *Attorney, Agent, or Firm* — Harness, Dickey & Pierce, P.L.C.

(57) ABSTRACT

A radiation-curable ink jet composition contains at least one monomer A represented by general formula (I): $CH_2=CR^1—COOR^2—O—CH=CH—R^3$, wherein $R^1$ represents a hydrogen atom or a methyl group, $R^2$ represents a divalent organic moiety having a carbon number of 2 to 20, and $R^3$ represents a hydrogen atom or a monovalent organic moiety having a carbon number of 1 to 11. The composition also contains a cyclic, linear, or branched monomer B containing a (meth)acryloyloxy or (meth)acryloyl group in which the total number of nitrogen atoms and oxygen atoms other than the oxygen atoms contained in the (meth)acryloyloxy or (meth)acryloyl group is at least 2, and at least one monomer C represented by the following general formula (II):

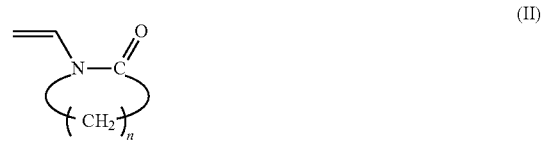

(II)

wherein n represents an integer of 2 to 6. The total content of monomer A is 10% by mass or more relative to the total mass of the ink jet composition.

13 Claims, No Drawings

RADIATION-CURABLE INK JET COMPOSITION AND INK JET PRINTING METHOD

BACKGROUND

1. Technical Field

The present invention relates to a radiation-curable ink jet composition and an ink jet printing method using the composition.

2. Related Art

Ink jet printing methods for forming images having high fastness to water, solvents, rubbing, and so forth on the surface of a printing medium have used radiation-curable ink compositions that can be cured by being irradiated with radiation in recent years.

For example, JP-A-2013-227515 discloses an active light-curable ink composition containing 70% by mass or more of a radically polymerizable monofunctional monomer and 18% by mass or more of a specific multifunctional acrylate oligomer. According to this patent document, the ink composition exhibits high spreadability and adhesion under high-temperature conditions and is suitable particularly for in-mold injection molding (unlikely to flow), and, in addition, the resulting images are unlikely to crack when being subjected to die cutting.

The ink composition disclosed in JP-A-2013-227515 is however not sufficiently curable despite containing 2-(2-vinyloxyethoxy)ethyl acrylate (VEEA). Although the curability of this ink composition can be improved by increasing the proportion of VEEA, simply increasing the proportion can increase the hardness of the cured film of the composition. This is a factor causing the lack of flexibility of the cured film of the composition. For radiation-curable ink jet compositions, which contain organic materials including a photopolymerization initiator and polymerizable compounds, such as a monofunctional monomer and a multifunctional monomer, reducing odor is one of the issues to be dealt with.

SUMMARY

An advantage of some aspects of the invention is that it provides a low-odor radiation-curable ink jet composition that is highly curable and is also flexible after being cured, and an ink jet printing method.

The following embodiments can solve at least one of the issues described above.

According to an aspect of the invention, there is provides a radiation-curable ink jet composition containing at least one monomer A represented by the following general formula (I): $CH_2=CR^1-COOR^2-O-CH=CH-R^3$, wherein $R^1$ represents a hydrogen atom or a methyl group, $R^2$ represents a divalent organic moiety having a carbon number of 2 to 20, $R^3$ represents a hydrogen atom or a monovalent organic moiety having a carbon number of 1 to 11. The composition also contains a cyclic, linear, or branched monomer B containing a (meth)acryloyloxy or (meth)acryloyl group. In monomer B, the total number of nitrogen atoms and oxygen atoms other than the oxygen atoms contained in the (meth)acryloyloxy or (meth)acryloyl group is at least 2. Also, the composition contains at least one monomer C represented by the following general formula (II):

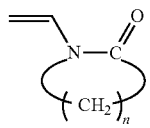

In general formula (II), n represents an integer of 2 to 6. The total content of monomer A is 10% by mass or more relative to the total mass of the ink jet composition.

In the ink jet composition, the presence of monomer B reduces odor, and 10% by mass or more of monomer A is involved in good curability. In addition, monomer C is involved in good flexibility of the cured film of the composition.

The total content of monomer C in the radiation-curable ink jet composition may be 23% by mass or less relative to the total mass of the ink jet composition.

Such a radiation-curable ink jet composition can be stably stored.

The total content of monomer A in the radiation-curable ink jet composition may be 25% by mass or less relative to the total mass of the ink jet composition.

Such a radiation-curable ink jet composition can be more flexible after being cured and can be more stably stored.

The total content of monomer C in the radiation-curable ink jet composition may be 5% by mass or more relative to the total mass of the composition.

Such a radiation-curable ink jet composition has a lower odor.

The total content of monomer A in the radiation-curable ink jet composition may be in the range of 10% by mass to 25% by mass relative to the total mass of the ink jet composition.

According to another aspect of the invention, there is provided an ink jet printing method including applying the above-described radiation-curable ink jet composition onto a printing medium, and irradiating the radiation-curable ink jet composition with light emitted from an ultraviolet light emitting diode (UV-LED).

The irradiation energy of the UV-LED may be 50 $mJ/cm^2$ to 1000 $mJ/cm^2$.

The irradiation intensity of the UV-LED may be 10 $mW/cm^2$ to 1000 $mW/cm^2$.

The printing medium onto which the ink jet composition is applied has a temperature of less than 45° C.

The ink jet printing method enables the printing of satisfactorily cured, flexible, and low-odor images.

DESCRIPTION OF EXEMPLARY EMBODIMENTS

Embodiments of the invention will now be described. The following embodiments will be described by way of example. The invention is not limited to the following embodiments, and various modifications may be made within the scope and spirit of the invention. All the components disclosed in the following embodiments are not required for the invention.

In the description herein, "(meth)acryloyl" refers to at least either acryloyl or methacryloyl; "(meth)acrylate" refers to at least either an acrylate or the corresponding methacrylate; and a "(meth)acrylic" compound refers to at least either an acrylic compound or the corresponding methacrylic compound.

1. Radiation-Curable Ink Jet Composition

The radiation-curable ink jet composition used in the embodiments described herein is used by being ejected from an ink jet head by an ink jet method. Although the following embodiment will describe a radiation-curable ink jet ink composition as the radiation-curable ink jet composition, the radiation-curable ink jet composition may be a composition used for three-dimensional (3D) fabrication in an embodiment. In the following embodiment, the term "radiation-curable" may be expressed as "UV-curable", "photo-curable", or the like by way of example in some cases. For example, the term "UV-curable" and a UV-curable composition used herein are considered equivalent to "radiation-curable" and a radiation-curable composition, respectively. Radiation may be ultraviolet (UV) light, infrared (IR) light, visible light, or X rays. UV light is preferred as the radiation from the viewpoint of availability and prevalence of radiation sources and materials that can be cured therewith.

The radiation-curable ink jet composition according to the present embodiment contains at least one monomer A represented by the following general formula (I): $CH_2=CR^1-COOR^2-O-CH=CH-R^3$, wherein $R^1$ represents a hydrogen atom or a methyl group, $R^2$ represents a divalent organic moiety having a carbon number of 2 to 20, $R^3$ represents a hydrogen atom or a monovalent organic moiety having a carbon number of 1 to 11. The composition also contains a cyclic, linear, or branched monomer B containing a (meth)acryloyloxy or (meth)acryloyl group in which the total number of nitrogen atoms and oxygen atoms other than the oxygen atoms contained in the (meth)acryloyloxy or (meth)acryloyl group is at least 2, and at least one monomer C represented by the following general formula (II):

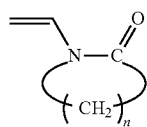

(II)

In general formula (II), n represents an integer of 2 to 6. The total content of monomer A is 10% by mass or more relative to the total mass of the ink jet composition.

The ingredients of the radiation-curable ink jet composition of the present embodiment will now be described.

1. 1. Polymerizable Compound 1. 1. 1. Monomer A

The radiation-curable ink jet composition of the present embodiment contains at least one monomer A (vinyl ether group-containing (meth)acrylate) represented by the following general formula (I): $CH_2=CR^1-COOR^2-O-CH=CH-R^3$, wherein $R^1$ represents a hydrogen atom or a methyl group, $R^2$ represents a divalent organic moiety having a carbon number of 2 to 20, and $R^3$ represents a hydrogen atom or a monovalent organic moiety having a carbon number of 1 to 11. The vinyl ether group-containing (meth)acrylate represented by general formula (I) hereinafter may be simply referred to as the compound of formula (I).

The composition containing monomer A (compound of formula (I)) can be highly curable. In addition, the compound of formula (I) tends to reduce the viscosity of the composition. Also, the use of monomer A, that is, a compound containing both a vinyl ether group and a (meth)acryloyl group, is more advantageous for increasing the curability of the composition than the use of a compound having a vinyl ether group and another compound having a (meth)acryloyl group.

In general formula (I), the divalent organic moiety represented by $R^2$ having a carbon number of 2 to 20 may be a substituted or unsubstituted linear, branched, or cyclic alkylene group having a carbon number of 2 to 20, a substituted or unsubstituted alkylene group having an oxygen atom of an ether bond and/or an ester bond in the molecular structure thereof and having a carbon number of 2 to 20, or a substituted or unsubstituted divalent aromatic group having a carbon number of 6 to 11. Preferred examples of these organic moieties include alkylene groups having a carbon number of 2 to 6, such as ethylene, n-propylene, isopropylene, and butylene; and alkylene groups having an oxygen atom of an ether bond in the molecular structure and having a carbon number of 2 to 9, such as oxyethylene, oxy n-propylene, oxyisopropylene, and oxybutylene. Preferably, monomer A is a compound having a glycol ether chain in which $R^2$ is an alkylene group having an oxygen atom of an ether bond in the molecular structure and having a carbon number of 2 to 9, such as oxyethylene, oxy n-propylene, oxyisopropylene, or oxybutylene, from the viewpoint of further reducing the viscosity of the ink jet composition and further increasing the curability.

In general formula (I), the monovalent organic moiety represented by $R^3$ having a carbon number of 1 to 11 may be a substituted or unsubstituted linear, branched, or cyclic alkyl group having a carbon number of 1 to 10 or a substituted or unsubstituted aromatic group having a carbon number of 6 to 11. Preferred groups among these are alkyl groups having a carbon number of 1 or 2, that is, methyl and ethyl, and aromatic groups having a carbon number of 6 to 8, such as phenyl and benzyl.

If any of the organic moieties is substituted, the substituent may or may not contain carbon. If the substituent contains carbon, the carbon is counted in the carbon number of the organic moiety. Examples of the substituent containing carbon include, but are not limited to, carboxy and alkoxy. Examples of the substituent not containing carbon include, but are not limited to, hydroxy and halogens.

Monomer A may be a mixture of a plurality of compounds represented by formula (I). The total content of compounds represented by formula (I) is 10% by mass or more relative to the total mass of the composition. The total content of compounds of formula (I) is preferably in the range of 10% by mass to 50% by mass, more preferably in the range of 10% by mass to 40% by mass, still more preferably in the range of 10% by mass to 30% by mass, and particularly in the range of 10% by mass to 25% by mass, relative to the total mass of the composition. The lower limit of the content of compounds of formula (I) may be 15% by mass. The composition containing 10% by mass or more of compounds of formula (I) is highly curable. Also, when the content of compounds of formula (I) is 25% by mass or less, the composition can be stably stored.

The proportion of the total monomer A content is preferably 0.14 or more relative to the total content of monomer A, monomer B, monomer C, and other monofunctional monomers. In this instance, the composition tends to be more highly curable. Also, from the viewpoint of reducing odor and improving flexibility, the proportion of the total monomer A content is preferably 0.35 or less.

The proportion (monomer A/monomer B) of the total monomer A content to the monomer B content is preferably 0.55 or more, and more preferably 1 or more. In this instance, the composition tends to be more highly curable.

When the monomer A/monomer B proportion is 2.0 or less, the odor of the composition tends to be low.

Also, the proportion (monomer A/monomer C) of the monomer A content to the monomer C content is preferably 0.7 or more, and more preferably 1.0 or more. Still more preferably, it is 1.5 or more. In this instance, the composition tends to be more highly curable. When the monomer A/monomer C proportion is 6.0 or less, flexibility tends to be improved.

Examples of the compound of formula (I) include, but are not limited to, 2-vinyloxyethyl (meth)acrylate, 3-vinyloxypropyl (meth)acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, vinyloxymethylphenylmethyl (meth)acrylate, m-vinyloxymethylphenylmethyl (meth)acrylate, o-vinyloxymethylphenylmethyl (meth)acrylate, 2-(2-vinyloxyethoxy)ethyl methacrylate, 2-(2-vinyloxyethoxy)ethyl acrylate (VEEA), 2-(vinyloxyisopropoxy)ethyl (meth)acrylate, 2-(vinyloxyethoxy)propyl (meth)acrylate, 2-(vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy) propyl (meth)acrylate, 2-(vinyloxyisopropoxyethoxy) propyl (meth)acrylate, 2-(vinyloxyisopropoxyisopropoxy)propyl (meth)acrylate, 2-(vinyloxyethoxyethoxy) isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)acrylate. Among these examples, VEEA, or 2-(2-vinyloxyethoxy)ethyl acrylate is particularly advantageous in terms of the balance between the curability and the viscosity of the composition.

1. 1. 2. Monomer B

The radiation-curable ink jet composition of the present embodiment also contains a cyclic, linear, or branched monomer B containing a (meth)acryloyloxy or (meth)acryloyl group and nitrogen, and the total number of nitrogen atoms and oxygen atoms other than the oxygen atoms contained in the (meth)acryloyloxy or (meth)acryloyl group is at least 2.

The monomer B content, in total, in the ink jet composition may be, but is not limited to, 5% by mass or more, and is preferably 10% by mass or more, more preferably 15% by mass or more. By adding monomer B, the odor of the composition can be reduced.

The upper limit of the monomer B content is preferably 50% by mass, more preferably 49% by mass, still more preferably 35% by mass, and further preferably 30% by mass, relative to the total mass of the composition. When the upper limit of the monomer B content is at such a level, the odor of the composition can be low, and also, the odor of the cured film of the composition can be low. In contrast, if the monomer B content exceeds such an upper limit, the solubility of the polymerization initiator may be reduced, and the curability of the composition may be insufficient.

The proportion of the monomer B content is preferably 0.15 or more relative to the total content of monomer A, monomer B, monomer C, and other monofunctional monomers. In this instance, the odor of the composition tends to be further reduced. Also, from the viewpoint of improving both the curability and the flexibility of the composition, the proportion of the monomer B content is preferably 0.28 or less.

Monomer B is preferably a compound containing a (meth)acryloyl group. More preferably, the (meth)acryloyl group is directly bound to a nitrogen atom. Also, it is preferable that at least one of the nitrogen and oxygen atoms be a member of a ring. Preferably, monomer B has a cyclic skeleton. More preferably, the cyclic skeleton has a heterocyclic structure. Such a compound is suitable to reduce the odor of the composition.

Examples of monomer B include N-acryloylmorpholine (ACMO), N-methacryloylmorpholine, 1-acryloylpyrrolidine-2-one, 1-methacryloylpyrrolidine-2-one, 1-acryloylpiperidine-2-one, 1-methacryloylpiperidine-2-one, 2-hydroxy-3-phenoxypropyl (meth)acrylate, cyclic trimethylolpropane formal (meth)acrylate, (2-methyl-2-ethyl-1,3-dioxolane-4-yl)methyl (meth)acrylate, hydroxyethyl acrylamide (HEAA), hydroxyethyl methacrylamide, dimethylaminopropyl acrylamide (DMAPAA), dimethylaminopropyl methacrylamide, and derivatives thereof The phrase "the total number of nitrogen and oxygen atoms is at least 2" includes the case of containing two or more nitrogen atoms, the case of two or more oxygen atoms, and the case of containing two or more nitrogen and oxygen atoms in total.

Among the above examples of monomer B, acrylamides are more advantageous. Preferably, monomer B has a cyclic skeleton. Such a compound tends to reduce the odor of the composition. Accordingly, N-acryloylmorpholine (ACMO), hydroxyethyl acrylamide (HEAA), and dimethylaminopropyl acrylamide (DMAPAA) are still more advantageous as monomer B.

1. 1. 3. Monomer C

The radiation-curable ink jet composition of the present embodiment further contains at least one monomer C represented by the following general formula (II):

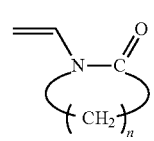

(II)

wherein n represents an integer in the range of 2 to 6.

By adding monomer C to the ink jet composition, the flexibility of the cured film of the composition can be increased. From the viewpoint of obtaining a satisfactory flexibility, n is preferably an integer of 3 to 6, more preferably 3 or 5. Still more preferably, n is 5; hence, N-vinylcaprolactam is more advantageously used. N-vinyl-2-pyrrolidone is also advantageous. N-vinylcaprolactam is superior in safety, versatile, and relatively inexpensive, and can increase the flexibility of the cured film of the composition. The lactam ring of the N-vinyl lactam or monomer C may be substituted by, for example, an alkyl group or an aryl group, or may be linked to a saturated or unsaturated ring structure.

Monomer C may be composed of a single compound or a mixture of vinyl lactams. The total content of monomer C in the ink jet composition is preferably 30% by mass or less, more preferably 25% by mass or less, still more preferably 23% by mass or less, and further preferably 20% by mass or less, relative to the total mass of the composition. When the total monomer C content is in such a range, the resulting image exhibits a good flexibility, and the composition can be stably stored. Also, the monomer C content is preferably 3% by mass or more, more preferably 5% by mass or more, and still more preferably 12% by mass or more. When the monomer C content is at such a level, the resulting image exhibits a good flexibility.

The proportion of the monomer C content is preferably 0.2 or more, more preferably 0.25 or more, relative to the total content of monomer A, monomer B, monomer C, and other monofunctional monomers, which will be described later. In this instance, the flexibility tends to be further increased. In addition, it is preferably 0.4 or less, more preferably 0.35 or less, from the viewpoint of reducing odor.

1. 1. 4. Other Monomers

The radiation-curable ink jet composition of the present embodiment may contain further monomers in addition to the above-described monomers A, B, and C. The further monomers include, but are not limited to, monofunctional, bifunctional, trifunctional, and higher functional monomers and oligomers.

1. 1. 4. 1. Monofunctional Monomer

The ink jet composition of the present embodiment may contain a monofunctional monomer. The monofunctional monomer may be, but is not limited to, a known monofunctional monomer having a polymerizable functional group, particularly a polymerizable functional group having a carbon-carbon unsaturated double bond. The monofunctional monomer may be a monofunctional (meth)acrylate having an aromatic ring skeleton.

The monofunctional (meth)acrylate having an aromatic ring skeleton is a compound having an aromatic ring skeleton and a single (meth)acryloyl group in the molecule thereof. Examples of the monofunctional (meth)acrylate having an aromatic ring skeleton include, but are not limited to, benzyl (meth)acrylate, phenoxyethyl (meth)acrylate (PEA), alkoxylated 2-phenoxyethyl (meth)acrylate, ethoxylated nonylphenyl (meth)acrylate, alkoxylated nonylphenyl (meth)acrylate, EO-modified p-cumylphenol (meth)acrylate, and 2-hydroxy-3-phenoxypropyl (meth)acrylate. These are commercially available, and examples thereof include Biscoat #192 (phenoxyethyl acrylate) produced by Osaka Organic Chemical Industry); and SR 340 (phenoxyethyl methacrylate), SR 339A (phenoxyethyl acrylate), SR 504 (ethoxylated nonylphenyl acrylate), CD 614 (alkoxylated nonylphenyl acrylate), and CD 9087 (alkoxylated 2-phenoxyethyl acrylate), each produced by Sartomer.

The monofunctional monomer can be represented by the following general formula (III) or (IV):

$$CH_2=CR^4-COOR^5-Ar \quad (III)$$

$$CH_2=CR^4-COO-Ar \quad (IV)$$

In the general formulas (III) and (IV), $R^4$ represents a hydrogen atom or a methyl group. In the general formula (III), Ar, which represents an aromatic ring skeleton, includes at least one aryl group that is a monovalent organic moiety whose carbon atom is bound to the group represented by $R^5$, and $R^5$ is a divalent organic moiety having a carbon number of 1 to 4. In the general formula (IV), Ar, which represents an aromatic ring skeleton, includes at least one aryl group that is a monovalent organic moiety whose carbon atom is bound to —COO—.

Examples of $R^5$ in general formula (III) include substituted or unsubstituted linear, branched, or cyclic alkylene groups having a carbon number of 1 to 4, and substituted or unsubstituted alkylene groups having an oxygen atom of an ether bond and/or an ester bond and having a carbon number of 1 to 4. Preferred examples of these organic groups include alkylene groups having a carbon number of 1 to 4, such as ethylene, n-propylene, isopropylene, and butylene; and alkylene groups having an oxygen atom of an ether bond in the molecular structure and having a carbon number of 1 to 4, such as oxyethylene, oxy n-propylene, oxyisopropylene, and oxybutylene. If $R^5$ is a substituted organic moiety, the substituent may be, but is not limited to, carboxy, alkoxy, hydroxy, or a halogen. If the substituent contains carbon, the carbon is counted in the carbon number of the organic moiety.

The aryl group contained in the aromatic ring skeleton represented by Ar in general formulas (III) and (IV) may be, but is not limited to, a phenyl group or a naphthyl group. The number of such aryl groups may be one or two. The aryl group may be substituted at any carbon atom other than the carbon atom bound to the organic moiety represented by $R^5$ in general formula (III), the carbon atom bound to —COO— in general formula (IV), and the carbon atom bound to another aryl group (in the case of containing a plurality of aryl groups). If it is substituted, the number of substituents may be one or two. Examples of the substituents include, but are not limited to, linear, branched, or cyclic alkyl and alkoxy groups having a carbon number of 1 to 10, carboxy, halogens, and hydroxy.

By adding a monofunctional (meth)acrylate having an aromatic ring skeleton, the solubility of the photopolymerization initiator that will be described alter can be advantageously increased. In particular, the solubility of acylphosphine oxide-based photopolymerization initiators and thioxanthone-based photopolymerization initiators tends to be increased. Preferably, the monofunctional (meth)acrylate having an aromatic ring skeleton is phenoxyethyl (meth)acrylate or benzyl (meth)acrylate. Phenoxyethyl (meth)acrylate has a low odor and is therefore more preferred. Phenoxyethyl (meth)acrylate is more preferred because it is highly compatible with the photopolymerization initiator and other additives, and can reduce the viscosity and odor of the composition and enhance the reactivity (curability) of the composition. Phenoxyethyl acrylate (PEA) is particularly preferred.

A monofunctional monomer having no aromatic ring skeleton may also be used, and examples thereof include unsaturated carboxylic acids, such as (meth)acrylic acid, itaconic acid, crotonic acid, isocrotonic acid, and maleic acid; salts of these unsaturated carboxylic acids; esters, urethanes, amides, and anhydrides of those unsaturated carboxylic acids; acrylonitrile, styrene, unsaturated polyesters, unsaturated polyethers, unsaturated polyamides, and unsaturated urethanes; and vinyl compounds, such as N-vinylformamide, N-vinylcarbazole, N-vinylacetamide, N-vinylpyrrolidone, and N-vinylcaprolactam; and acrylamides, such as dimethylacetamide (DMAA) and dimethylaminoethyl acrylate (DMAEA) benzyl chloride quaternary salt. These monofunctional monomers may be used singly or in combination.

From the viewpoint of improving the curability of the composition, monofunctional (meth)acrylic acid esters, that is, monofunctional (meth)acrylates are more preferred.

Exemplary monofunctional (meth)acrylates include isoamyl (meth)acrylate, stearyl (meth)acrylate, lauryl (meth)acrylate, octyl (meth)acrylate, decyl (meth)acrylate, isodecyl (meth)acrylate (IDA), isomyristyl (meth)acrylate, isostearyl (meth)acrylate, 2-hydroxybutyl (meth)acrylate, butoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, flexible lactone-modified (meth)acrylate, t-butylcyclohexyl (meth)acrylate, dicyclopentanyl (meth)acrylate, dicycolpentenyloxyethyl (meth)acrylate, and (1,4-dioxaspiro[4.5]dec-2-yl)methyl 2-(meth)acrylate.

Preferably, the total content of monofunctional (meth)acrylates in the ink jet composition is 5% by mass to 40% by mass relative to the total mass of the composition. When the monofunctional (meth)acrylate content is 5% by mass or more, the composition is highly curable, and the photopolymerization initiator is soluble in the composition. Also, when the monofunctional (meth)acrylate content is 40% by mass or less, the composition is highly curable. From the viewpoint of increasing the solubility of the photopolymerization initiator and the curability of the composition, the monofunctional (meth)acrylate content is more preferably in the range of 10% by mass to 35% by mass, still more preferably 10% by mass to 30% by mass, and further preferably 15% by mass to 25% by mass.

1. 1. 4. 2. Multifunctional Monomer

The ink jet composition of the present embodiment may contain a multifunctional monomer. For example, a bifunctional (meth)acrylate may be used, and examples thereof include dipropylene glycol di(meth)acrylate, triethylene glycol di(meth)acrylate, tetraethylene glycol di(meth)acrylate, polyethylene glycol di(meth)acrylate, dipropylene glycol dimethacrylate, dipropylene glycol diacrylate (DPGDA), tripropylene glycol di(meth)acrylate, polypropylene glycol di(meth)acrylate, 1,4-butanediol di(meth)acrylate, 1,6-hexanediol di(meth)acrylate, 1,9-nonane diol di(meth)acrylate, neopentyl glycol di(meth)acrylate, dimethylol tricyclodecane di(meth)acrylate, bisphenol A ethylene oxide (EO) adduct di(meth)acrylate, bisphenol A propylene oxide (PO) adduct di(meth)acrylate, hydroxypivalic acid neopentyl glycol di(meth)acrylate, and polytetramethylene glycol di(meth)acrylate.

Exemplary trifunctional or higher functional (meth)acrylates include trimethylolpropane tri(meth)acrylate, EO-modified trimethylolpropane tri(meth)acrylate, pentaerythritol tri(meth)acrylate, pentaerythritol tetra(meth)acrylate, dipentaerythritol hexa(meth)acrylate, ditrimethylolpropane tetra(meth)acrylate, glycerinpropoxy tri(meth)acrylate, caprolactone-modified trimethylolpropane tri(meth)acrylate, pentaerythritolethoxy tetra(meth)acrylate, and caprolactam-modified dipentaerythritol hexa(meth)acrylate.

An oligomer (that may be a dimer or a trimer) or a prepolymer may be used as the trifunctional or higher functional (meth)acrylate. The oligomer or the prepolymer may contain any of the above-cited monomers. Preferably, the radiation-curable ink jet composition contains a multifunctional oligomer. By adding a multifunctional oligomer, the radiation-curable ink jet composition can be stably stored, and the rub fastness of the patterns formed of the composition can be increased. The oligomer may be a urethane oligomer in which urethane forms a repeating structure, or an epoxy oligomer in which epoxy forms a repeating structure.

Exemplary multifunctional acrylate oligomers include oligoester acrylates, such as urethane acrylate oligomers, polyester acrylate oligomers, and epoxy acrylate oligomers. Urethane acrylate oligomers include aliphatic urethane acrylate oligomers and aromatic urethane acrylate oligomers, and aliphatic urethane acrylate oligomers are more advantageous. If a urethane acrylate oligomer is used, a tetrafunctional or lower functional urethane acrylate oligomer is advantageous, and bifunctional urethane acrylate oligomer is more advantageous.

If the ink jet composition contains one or more multifunctional (meth)acrylates, the total content of multifunctional (meth)acrylates is preferably in the range of 1% by mass to 40% by mass, more preferably in the range of 5% by mass to 30% by mass, and further preferably in the range of 5% by mass to 20% by mass, relative to the total mass of the composition. By controlling the multifunctional (meth)acrylate content in such a range, the curability of the composition can be further improved. Also, when the composition contains a urethane oligomer, the flexibility of the cured composition is likely to be good.

The composition of the present embodiment is preferably a non-aqueous composition in which the polymerizable compounds dominantly constitute the medium of the composition in which the photopolymerization initiator, a coloring material, and other solids are dissolved or dispersed, in view of curability and storage stability. In other words, the polymerizable compounds account for the highest proportion of the medium of the composition. The total content of the polymerizable compounds is preferably in the range of 40% by mass to 95% by mass, more preferably 50% by mass or more, still more preferably 60% by mass or more, and also more preferably 90% by mass or less, still more preferably 80% by mass or less, relative to the total mass of the composition. By controlling the total content of the polymerizable compounds in such a range, the viscosity and odor of the composition can be reduced, and the solubility and reactivity of the photopolymerization initiator can be increased.

1. 2. Polymerization Initiator

Preferably, the composition of the present embodiment contains a radiation polymerization initiator (may be hereinafter referred to as the photopolymerization initiator or the polymerization) capable of producing an active species by being irradiated with radiation as the polymerization initiator. Examples of the polymerization initiator include, but are not limited to, alkylphenone-based photopolymerization initiators, acylphosphine oxide-based photopolymerization initiators, titanocene-based photopolymerization initiators, thioxanthone-based photopolymerization initiators, and other known photopolymerization initiators. Among those, acylphosphine oxide-based photopolymerization initiators are more advantageous. By adding an acylphosphine oxide-based photopolymerization initiator, the curability of the composition can be increased, and such a composition tends to exhibit a much higher curability in a UV-LED curing process.

Examples of the acylphosphine oxide-based photopolymerization initiator include 2,4,6-trimethylbenzoyldiphenylphosphine oxide, bis(2,4,6-trimethylbenzoyl)phenylphosphine oxide, and bis(2,6-dimethoxybenzoyl)-2,4,4-trimethylpentylphosphine oxide.

Some acylphosphine oxide-based photopolymerization initiators are commercially available, and examples thereof include IRGACURE 819 (bis(2,4,6-trimethylbenzoyl)phenylphosphine oxide, IRGACURE 1800 (mixture of bis(2,6-dimethoxybenzoyl)-2,4,4-trimethylpentylphosphine oxide and 1-hydroxycyclohexyl phenyl ketone with a mass ratio of 25:75), and IRGACURE TPO (2,4,6-trimethylbenzoylphenylphosphine oxide), each produced by BASF.

Photopolymerization initiators may be used singly or in combination. The photopolymerization initiator content, in total, is preferably in the range of 1% by mass to 20% by mass relative to the total mass of the composition from the viewpoint of increasing curability and solubility. More preferably, it is in the range of 3% by mass to 15% by mass, still more preferably in the range of 5% by mass to 10% by mass, and further preferably in the range of 7% by mass to 9% by mass.

1. 3. Other Ingredients

The radiation-curable ink composition used in the present embodiment may optionally contain other ingredients, such as a coloring material, a dispersant, a polymerization inhibitor, a slipping agent, and a photosensitizer.

Coloring Material

The composition of the present embodiment may further contain a coloring material. The composition containing a coloring material can be used as a colored ink composition. The coloring material may be either one or both of a pigment and a dye.

Pigment

A pigment used as a color material can enhance the light fastness of the ink composition. The pigment may be an inorganic pigment or an organic pigment.

Examples of the inorganic pigment include carbon blacks (C. I. Pigment Black 7), such as furnace black, lamp black, acetylene black, and channel black, and iron oxide and titanium oxide.

Examples of the organic pigment include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments.

More specifically, carbon blacks used in a black composition include No. 2300, No. 900, MCF 88, No. 33, No. 40, No. 45, No. 52, MA7, MA8, MA100, and No. 2200B (each produced by Mitsubishi Chemical Corporation); Raven 5750, Raven 5250, Raven 5000, Raven 3500, Raven 1255, and Raven 700 (each produced by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (each produced by Cabot); and Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, and Special Black 4 (each produced by Degussa).

Pigments that can be used in a white composition include C. I. Pigment Whites 6, 18, and 21.

Pigments that can be used in a yellow composition include C. I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

Pigments that can be used in a magenta composition include C. I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245; and C. I. Pigment Violets 19, 23, 32, 33, 36, 38, 43, and 50.

Pigments that can be used in a cyan composition include C. I. Pigment Blues 1, 2, 3, 15, 15:1, 15:2, 15:3, 15:34, 15:4, 16, 18, 22, 25, 60, 65, and 66; and C. I. Violet Blues 4 and 60.

Pigments other than magenta, yellow, cyan, and yellow pigments include C. I. Pigment Greens 7 and 10, C. I. Pigment Browns 3, 5, 25, and 26, and C. I. Pigment Oranges 1, 2, 5, 7, 13, 14, 15, 16, 24, 34, 36, 38, 40, 43, and 63.

The above pigments may be used singly or in combination. If any of the above-cited pigments is used in the composition, the average particle size of the pigment is preferably 300 nm or less, and more preferably 50 nm to 200 nm. When the pigment has such an average particle size, the pigment can be stably dispersed in the ink jet composition, and the ink jet composition can be stably ejected and can form high-quality images. The average particle size mentioned herein is a value measured by dynamic light scattering.

Dye

A dye may be used as a coloring material. Any dye, including acid dyes, direct dyes, reactive dyes, and basic dyes, may be used without particular limitation. Examples of the dye include C. I. Acid Yellows 17, 23, 42, 44, 79, and 142, C. I. Acid Reds 52, 80, 82, 249, 254, and 289, C. I. Acid Blues 9, 45, and 249, C. I. Acid Blacks 1, 2, 24, and 94, C. I. Food Blacks 1 and 2, C. I. Direct Yellows 1, 12, 24, 33, 50, 55, 58, 86, 132, 142, 144, and 173, C. I. Direct Reds 1, 4, 9, 80, 81, 225, and 227, C. I. Direct Blues 1, 2, 15, 71, 86, 87, 98, 165, 199, and 202, C. I. Direct Blacks 19, 38, 51, 71, 154, 168, 171, and 195, C. I. Reactive Reds 14, 32, 55, 79, and 249, and C. I. Reactive Blacks 3, 4, and 35. These dyes may be used singly or in combination.

The coloring material content, in total, is preferably in the range of 1% by mass to 20% by mass relative to the total mass of the ink jet composition. The composition may be a clear composition (clear ink) that does not contain a coloring material or contains such a small amount of a coloring material that it is not intended for coloring (for example, 0.1% by mass or less).

Dispersant

If the ink composition contains a pigment, a dispersant may be added so that the pigment can be sufficiently dispersed. The dispersant may be, but is not limited to, a polymer dispersant or the like that is generally used for preparing a pigment dispersion. Examples of polymer dispersant include polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins. The polymer dispersant may contain these compound singly or in combination. The polymer dispersant is commercially available, and examples thereof include AJISPER series produced by Ajinomoto Fine-Techno, Solsperse series, such as Solsperse 36000, available from Avecia or Noveon, Disper BYK series produced by BYK Additives & Instruments, and DISPARLON series produced by Kusumoto Chemicals.

Polymerization Inhibitor

The composition of the present embodiment may further contain a hindered amine compound or any other compound as a polymerization inhibitor. Examples of such a polymerization inhibitor include, but are not limited to, p-methoxyphenol, hydroquinone monomethyl ether (MEHQ), hydroquinone, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol). The above polymerization inhibitors may be used singly or in combination.

Preferably, the polymerization initiator content, in total, is in the range of 0.05% by mass to 0.5% by mass, more preferably in the range of 0.1% by mass to 0.5% by mass, relative to the total mass of the composition.

Slipping Agent

The composition of the present embodiment may further contain a slipping agent. Advantageously, the slipping agent is a silicone surfactant, and a polyester-modified silicone or a polyether-modified silicone are more advantageous. Examples of the polyester-modified silicone include BYK-347, BYK-348, BYK-UV3500, BYK-UV3510, and BYK-UV3530 (each produced by BYK Additives & Instruments). The polyether-modified silicone may be BYK-3570 (produced by BYK Additives & Instruments). Slipping agents may be used singly or in combination.

Preferably, the slipping agent content, in total, is in the range of 0.01% by mass to 2% by mass, more preferably in the range of 0.05% by mass to 1% by mass, relative to the total mass of the composition.

Photosensitizer

The composition of the present embodiment may further contain a photosensitizer. Examples of the photosensitizer include amine compounds, such as aliphatic amines, amines having an aromatic group, piperidine, reaction products of an epoxy resin and an amine, and triethanolamine triacrylate; urea compounds, such as allylthioureas and o-tolylthiourea; sulfur compounds, such as sodium diethyldithiophosphate and soluble aromatic sulfonates; nitrile compounds, such as N,N-diethyl-p-aminobenzonitrile; phosphorus compounds, such as tri-n-butylphosphine and sodium diethyldithiophosphide; nitrogen compounds, such as Michler's ketone, N-nitrosohydroxylamine derivatives, oxazolidine compounds, tetrahydro-1,3-oxazine compounds, and condensates of formaldehyde or acetaldehyde and a diamine; and chlorine compounds, such as carbon tetrachloride and hexachloroethane.

1. 4. Physical Properties

Preferably, the composition of the present embodiment has a viscosity of 25 mPa·s or less, more preferably 5 mPa·s to 20 mPa·s, at 20° C. When the viscosity of the composition is in such a range at 20° C., an appropriate amount of the composition is ejected through nozzles, and accordingly, deviation or scattering of the droplets of the composition can be reduced. Thus, the composition with such a viscosity is suitable for use in ink jet printing apparatuses. The viscosity can be measured with a viscoelasticity meter, such as MCR-300 (manufactured by Pysica), by increasing the shear rate to 10 to 1000 at 20° C. and reading the indicated value of the meter at a shear rate of 200.

Preferably, the composition has a surface tension in the range of 20 mN/m to 30 mN/m at 20° C. When the surface tension of the composition is in this range at 20° C., the composition is unlikely to wet the nozzles that have been subjected to water-repellent treatment. Consequently, an appropriate amount of the composition can be ejected through nozzles, and deviation or scattering of the composition can be further reduced. Thus, the composition with a surface tension in such a range is suitable for use in ink jet printing apparatuses. The surface tension can be determined by measuring the composition wetting a platinum plate at 20° C. with an automatic surface tensiometer CBVP-Z (manufactured by Kyowa Interface Science).

1. 5. Preparation of Ink Jet Composition

The ink jet composition can be prepared by mixing the ingredients and sufficiently stirring the ingredients to the extent that the mixture becomes uniform. In the preparation of the composition of the present embodiment, a mixture containing the photopolymerization initiator and at least one or a portion of the polymerizable compounds may be subjected to at least either ultrasonic treatment or heating. Such treatment can reduce dissolved oxygen in the composition, and thus the composition can be stably ejected and stably stored. The mixture may further contain all or some of the other ingredients of the composition, in addition to the photopolymerization initiator and the polymerizable compound. The polymerizable compound in the mixture can be one or a portion of the polymerizable compounds that will be contained in the composition.

2. Ink Jet Printing Method

The ink jet printing method according to an embodiment of the invention includes applying the above-described radiation-curable ink jet composition onto a printing medium, and irradiating the radiation-curable ink jet composition on the printing medium with light emitted from an ultraviolet light emitting diode (UV-LED). Thus, a cured film is formed at the region on the printing medium where the composition has been applied.

Applying Ink Jet Composition

For applying the ink jet composition onto a printing medium, a known ink jet printing apparatus may be used. From the viewpoint of ejecting the composition, the viscosity of the composition at 20° C. is preferably 25 mPa·s or less, and more preferably in the range of 5 mPa·s to 20 mPa·s. The composition having a viscosity in such a range can be ejected at room temperature without being heated. Alternatively, the composition may be heated to a predetermined temperature so that the viscosity of the composition is adjusted to a level suitable to be ejected. Thus, the composition is stably ejected.

Radiation-curable ink jet compositions have a higher viscosity than aqueous ink compositions generally used for ink jet printing. Accordingly, the viscosity of radiation-curable ink jet compositions varies considerably depending on temperature during ejection. The change in viscosity of an ink jet composition affects the size of the composition droplets and the ejection speed of the droplets and can degrade the resulting image quality. Accordingly, it is preferable that the composition be kept at a constant temperature while being ejected.

Examples of the printing medium include, but are not limited to, plastic films made of, for example, polyvinyl chloride, polyethylene terephthalate, polypropylene, polyethylene, or polycarbonate, surface-treated films thereof, glass films or plates, and coated paper sheets.

The printing medium may be flexible. This is effective in reducing cracks and wrinkles in the images, or flexible cured films, formed of the ink jet composition disclosed herein. A flexible printing medium used herein refers to a printing medium that will not be broken or cracked even by being bent 90 degrees against an iron bar of mm in diameter. Examples of such a flexible printing medium include paper sheets, paper sheets laminated with a plastic (such as polyethylene, polypropylene, or polystyrene), metal sheets (of, for example, aluminum, zinc, or copper), and plastic films (of, for example, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, or polyvinyl acetal).

Curing (Irradiation)

In a subsequent step, the composition on the printing medium is cured by being irradiated with light from a UV-LED. Hence, the coating of the composition formed on the printing medium is turned into a cured film by being irradiated with light from a UV-LED. More specifically, the photopolymerization initiator in the composition is decomposed to produce an active species (initiation species), such as a radical, an acid or, a base, by the irradiation with UV light, and the initiation species induces polymerization of the polymerizable compounds. Alternatively, the photopolymerization reaction of the polymerizable compounds is started by irradiation with UV light. At this time, if a sensitizing dye is present in the composition together with the photopolymerization initiator, the sensitizing dye is excited by absorbing the active radiation. The excited sensitizing dye then comes into contact with the photopolymerization initiator and promotes the decomposition of the photopolymerization initiator, and thus, a highly sensitive curing reaction can be performed.

Also, the use of a UV-LED as a UV radiation source can reduce system size and cost. The UV-LED, which is small as a UV radiation source, may be incorporated into the ink jet printing apparatus. For example, the UV-LED may be attached to the carriage on which a print head capable of ejecting the composition is mounted (on both ends of the carriage in the direction parallel to the width of the printing medium and/or on the side of the carriage in the direction in which the printing medium is transported). In addition, the UV-LED can rapidly cure the composition at a low energy, depending on the constituents and their contents in the ink composition. The irradiation energy is calculated by multiplying irradiation time by irradiation intensity. Therefore, the irradiation time can be reduced, and the printing speed can be increased. Also, the irradiation intensity can be reduced. Thus, temperature increase of prints can be reduced, and accordingly, the odor of the cured film can be reduced.

From the viewpoint of reducing the odor of the cured film, the irradiation energy is preferably 50 mJ/cm$^2$ to 1000 mJ/cm$^2$, more preferably 100 mJ/cm$^2$ to 700 mJ/cm$^2$, still more preferably 200 mJ/cm$^2$ to 600 mJ/cm$^2$. Since the composition of the present embodiment is highly curable, the radiation energy may be 50 mJ/cm$^2$ to 500 mJ/cm$^2$, 70 mJ/cm$^2$ to 500 mJ/cm$^2$, or 100 mJ/cm$^2$ to 350 mJ/cm$^2$ from the viewpoint of balancing curability with productivity.

From the viewpoint of reducing the odor of the cured film, the irradiation intensity is preferably 10 mW/cm$^2$ to 1000 mW/cm$^2$, more preferably 30 mW/cm$^2$ to 700 mW/cm$^2$, still more preferably 50 mW/cm$^2$ to 500 mW/cm$^2$.

The temperature of the printing medium during printing is preferably less than 45° C., more preferably 40° C. or less, and still more preferably 35° C. or less. By controlling the temperature of the printing medium to such a level during printing, the monomers in the composition are prevented from evaporating from the applied coating of the composition, and thus odor is reduced.

3. Experiment 1

The subject matter of the invention will now be further described in detail with reference to the following Experiment 1 (including a plurality of Examples). However, the invention is not limited to the Examples.

3. 1. Preparation of Ink Jet Compositions

First, a coloring material, a dispersant, and some or a portion of the monomers were added into a pigment dispersing tank and stirred with ceramic beads of 1 mm in diameter to yield a pigment dispersion liquid in which the coloring material was dispersed in the polymerizable compounds. Then, for preparing each composition shown in Table 1 or 2, the rest of the monomers, a polymerization initiator, and a polymerization initiator were added into a stainless steel mixing tank and stirred for mixing. After the ingredients were sufficiently mixed, the pigment dispersion liquid was added, followed by stirring at room temperature for 1 hour. Subsequently, the mixture was filtered through a 5 μm membrane filter. Thus, ink jet compositions of Examples were prepared. The values of ingredients shown in the Tables are represented in percent by mass. The proportions in the Tables are represented on a mass basis.

TABLE 1

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Monomer A | VEEA | 20 | 8 | 10 | 20 | 20 | 20 | 20 | 25 | 28 | 20 | 20 |
| Monomer B | ACMO | 18 | 18 | 18 | 18 | 18 | 18 | 18 | 18 | 18 | 10 | 23 |
| Monomer C | NVC | 13 | 13 | 13 | 25 | 20 | 5 | 3 | 13 | 13 | 13 | 13 |
| | PEA | 20 | 32 | 30 | 8 | 13 | 28 | 30 | 15 | 12 | 28 | 15 |
| Multifunctional monomer | DPGDA | 6 | 6 | 6 | 6 | 6 | 6 | 6 | 6 | 6 | 6 | 6 |
| | Urethane oligomer | 9 | 9 | 9 | 9 | 9 | 9 | 9 | 9 | 9 | 9 | 9 |
| Polymerization initiator | Irg. 819 | 5 | 5 | 5 | 5 | 5 | 5 | 5 | 5 | 5 | 5 | 5 |
| | TPO | 5 | 5 | 5 | 5 | 5 | 5 | 5 | 5 | 5 | 5 | 5 |
| Polymerization inhibitor | MEHQ | 0.6 | 0.6 | 0.6 | 0.6 | 0.6 | 0.6 | 0.6 | 0.6 | 0.6 | 0.6 | 0.6 |
| Stop agent | BYK-UV3500 | 0.2 | 0.2 | 0.2 | 0.2 | 0.2 | 0.2 | 0.2 | 0.2 | 0.2 | 0.2 | 0.2 |
| Coloring material | Carbon black | 3 | 3 | 3 | 3 | 3 | 3 | 3 | 3 | 3 | 3 | 3 |
| | PB 15:3 | — | — | — | — | — | — | — | — | — | — | — |
| | PR 122 | — | — | — | — | — | — | — | — | — | — | — |
| | PY 151 | — | — | — | — | — | — | — | — | — | — | — |
| Dispersant | solsperse 36000 | 0.2 | 0.2 | 0.2 | 0.2 | 0.2 | 0.2 | 0.2 | 0.2 | 0.2 | 0.2 | 0.2 |
| | Total | 100 | 100 | 100 | 100 | 100 | 100 | 100 | 100 | 100 | 100 | 100 |
| Proportion | VEEA/(VEEA + NVC + ACMO + PEA) | 0.28 | 0.11 | 0.14 | 0.28 | 0.28 | 0.28 | 0.28 | 0.35 | 0.39 | 0.28 | 0.28 |
| | NVC/(VEEA + NVC + ACMO + PEA) | 0.18 | 0.18 | 0.18 | 0.35 | 0.28 | 0.07 | 0.04 | 0.18 | 0.18 | 0.18 | 0.18 |
| | ACMO/(VEEA + NVC + ACMO + PEA) | 0.25 | 0.25 | 0.25 | 0.25 | 0.25 | 0.25 | 0.25 | 0.25 | 0.25 | 0.14 | 0.32 |
| | VEEA/NVC | 1.54 | 0.62 | 0.77 | 0.80 | 1.00 | 4.00 | 6.67 | 1.92 | 2.15 | 1.54 | 1.54 |
| | VEEA/ACMO | 1.11 | 0.44 | 0.56 | 1.11 | 1.11 | 1.11 | 1.11 | 1.39 | 1.56 | 2.00 | 0.87 |

TABLE 1-continued

|  |  | Example | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Evaluation | Curability | A | C | A | A | A | A | A | A | A | A | B |
|  | Odor | A | B | B | A | A | B | B | A | A | C | A |
|  | Flexibility | B | A | C | A | A | C | E | C | D | B | B |
|  | Hardness | A | D | B | B | B | C | D | A | A | A | A |
|  | Storage stability | B | B | B | D | C | B | B | B | B | B | A |

TABLE 2

|  |  | Example | | | | | | | | | | |
|---|---|---|---|---|---|---|---|---|---|---|---|---|
|  |  | 12 | 13 | 14 | 15 | 16 | 17 | 18 | 19 | 20 | 21 | 22 |
| Monomer A | VEEA | 20 | 20 | 20 | 20 | 14 | 24 | 9 | 1 | — | 20 | 20 |
| Monomer B | ACMO | 18 | 18 | 18 | 18 | 13 | 22 | 18 | 18 | 18 | 18 | — |
| Monomer C | NVC | 13 | 13 | 13 | 13 | 9 | 16 | 25 | 25 | 13 | — | 13 |
|  | PEA | 21 | 20 | 20 | 29 | 35 | 9 | 19 | 27 | 40 | 33 | 38 |
| Multifunctional | DPGDA | 6 | 6 | 6 | 6 | 6 | 6 | 6 | 6 | 6 | 6 | 6 |
| monomer | Urethane oligomer | 9 | 9 | 9 | — | 9 | 9 | 9 | 9 | 9 | 9 | 9 |
| Polymerization | Irg. 819 | 5 | 5 | 5 | 5 | 5 | 5 | 5 | 5 | 5 | 5 | 5 |
| initiator | TPO | 5 | 5 | 5 | 5 | 5 | 5 | 5 | 5 | 5 | 5 | 5 |
| Polymerization inhibitor | MEHQ | 0.6 | 0.6 | 0.6 | 0.6 | 0.6 | 0.6 | 0.6 | 0.6 | 0.6 | 0.6 | 0.6 |
| Stop agent | BYK-UV3500 | 0.2 | 0.2 | 0.2 | 0.2 | 0.2 | 0.2 | 0.2 | 0.2 | 0.2 | 0.2 | 0.2 |
| Coloring material | Carbon black | — | — | — | 3 | 3 | 3 | 3 | 3 | 3 | 3 | 3 |
|  | PB 15:3 | 2 | — | — | — | — | — | — | — | — | — | — |
|  | PR 122 | — | 3 | — | — | — | — | — | — | — | — | — |
|  | PY 151 | — | — | 3 | — | — | — | — | — | — | — | — |
| Dispersant | solsperse 36000 | 0.2 | 0.2 | 0.2 | 0.2 | 0.2 | 0.2 | 0.2 | 0.2 | 0.2 | 0.2 | 0.2 |
|  | Total | 100 | 100 | 100 | 100 | 100 | 100 | 100 | 100 | 100 | 100 | 100 |
| Proportion | VEEA/(VEEA + NVC + ACMO + PEA) | 0.28 | 0.28 | 0.28 | 0.25 | 0.20 | 0.34 | 0.13 | 0.01 | — | 0.28 | 0.28 |
|  | NVC/(VEEA + NVC + ACMO + PEA) | 0.18 | 0.18 | 0.18 | 0.16 | 0.13 | 0.22 | 0.35 | 0.35 | 0.18 | — | 0.18 |
|  | ACMO/(VEEA + NVC + ACMO + PEA) | 0.25 | 0.25 | 0.25 | 0.23 | 0.18 | 0.30 | 0.25 | 0.25 | 0.25 | 0.25 | — |
|  | VEEA/NVC | 1.54 | 1.54 | 1.54 | 1.54 | 1.54 | 1.54 | 0.36 | 0.04 | — | — | 1.54 |
|  | VEEA/ACMO | 1.11 | 1.11 | 1.11 | 1.11 | 1.11 | 1.11 | 0.50 | 0.06 | — | 1.11 | — |
| Evaluation | Curability | A | A | A | A | B | B | C | D | D | A | A |
|  | Odor | A | A | A | A | A | A | B | B | B | B | D |
|  | Flexibility | B | B | B | C | B | B | A | A | A | F | E |
|  | Hardness | A | A | A | A | A | A | D | D | D | D | B |
|  | Storage stability | B | B | B | B | B | B | D | D | D | B | B |

Abbreviations used in the Tables are as follows.
Polymerizable Compounds
Monomer (A)
  VEEA (2-(2-vinyloxyethoxy)ethyl acrylate, produced by Nippon Shokubai)
Monomer (B)
  ACMO (acryloylmorpholine, produced by KJ Chemicals)
Monomer (C)
  NVC (N-vinylcaprolactam, available from ISP Japan)
Further Monomer (Monofunctional)
  PEA (phenoxyethyl acrylate, Biscoat #192 (product name) produced by Osaka Organic Chemical Industry)
Further Monomers (Multifunctional)
  DPGDA (dipropylene glycol diacrylate, SR 508 (product name) produced by Sartomer)
  Urethane oligomer (EBECRYL 230 (product name) produced by Daicel-Allnex)
Photopolymerization Initiators
  Irq. 819 (bis(2,4,6-trimethylbenzoyl)phenylphosphine oxide, IRGACURE 819 (product name) produced by BASF)
  TPO (2,4,6-trimethylbenzoyldiphenylphosphine oxide, IRGACURE TPO (product name) produced by BASF)
Polymerization Inhibitor
  MEHQ (hydroquinone monomethyl ether, p-Methoxyphenol (product name) produced by Kanto Chemical)
Slipping Agent
  BYK-UV3500 (product name of BYK Additives & Instruments, acryloyl group-containing polyether-modified polydimethylsiloxane)
Coloring Materials
  Carbon black (MA-100 (product name) produced by Mitsubishi Chemical)
  PB 15:3 (C. I. Pigment Blue 15:3)
  PR 122 (C. I. Pigment Red 122)
  PY 151 (C. I. Pigment Yellow 151)
Dispersant
  Solsperse 36000 (product name of Lubrizol, polymer dispersant)

3. 2. Evaluation
(1) Curability

Each ink jet composition was printed and cured in the following manner. First, a PET film with a receiving layer (Ester Film E5000 (125 μm in thickness, manufactured by Toyobo) stuck on the table of a transport unit configured to linearly transport a test sample was transported. During the transport, the ink jet composition was ejected from an ink jet head onto the PET film, and the printed sample was passed under an irradiation device to be irradiated with light. The degree of curing at that time was examined by finger touch. The composition was printed at a rate of 14 ng/dot with resolutions of 720 dpi×720 dpi. The irradiation intensity at the print surface was 1 W/cm$^2$. The printed sample size was 1 inch×1 inch. The irradiation energy was adjusted by varying the transport speed of the sample. Each ink jet composition was irradiated with UV light having an emission peak wavelength of 395 nm. The irradiation energy (mJ/cm$^2$) required for curing the composition was measured. More specifically, the energy of irradiation with UV light required for curing was determined by measuring the total light quantity with an integrating actinometer UM-40 (manufactured by Konica Minolta) when the printed solid pattern was irradiated until the stickiness on fingers of the solid pattern was lost. The temperature of the PET film, or printing medium, was 40° C. during printing and curing. The evaluation criteria were as follows, and the results are shown in Tables 1 and 2.

A: Total light quantity was 200 mJ/cm$^2$ or less.

B: Total light quantity was more than 200 mJ/cm$^2$ to 350 mJ/cm$^2$.

C: Total light quantity was more than 350 mJ/cm$^2$ to 500 mJ/cm$^2$.

D: Total light quantity was more than 500 mJ/cm$^2$.

(2) Odor of Ink Jet Compositions

Each ink jet composition was smelled immediate after being prepared and was evaluated according to the following criteria. The results are shown in Tables 1 and 2.

Criteria:

A: Odorless

B: So weak as barely sensed

C: Weak odor to the extent that it was recognized what smell it was

D: So strong as easily sensed (3) Flexibility

Solid patterns were printed for each Example in the same manner as in the case of examining curability, except that the irradiation conditions were varied. Each sample was irradiated for 10 minutes with UV light having a wavelength of 365 nm from a UV irradiation apparatus at an irradiation intensity of 17 mW/cm$^2$. The thickness of each cured film was 10 µm±0.5 µm. Subsequently, the PET film on which the cured film was formed was repeatedly bent up to about 45° C. by hand in such a manner that the cured film side of the PET film reciprocally forms a protrusion and a recessed portion, and then the state of the cured film was visually observed and rated according to the following criteria. The results are shown in Tables 1 and 2.

The state of each sample was observed at the bending position.

A: After repeating reciprocal bending 100 times, separation between the cured film and the PET film and cracks or any other breakage in the cured film were not observed.

B: After repeating reciprocal bending 100 times, some separation between the cured film and the PET film was observed.

C: After repeating reciprocal bending 100 times, some separation between the cured film and the PET film and cracks or the like in the cured film were observed.

D: After repeating reciprocal bending 50 times, some separation between the cured film and the PET film and cracks or the like in the cured film were observed.

E: After repeating reciprocal bending 20 times, some separation between the cured film and the PET film and cracks or the like in the cured film were observed.

F: After repeating reciprocal bending 10 times, some separation between the cured film and the PET film and cracks or the like in the cured film were observed.

(4) Hardness

The same films as those prepared for evaluating the curability were subjected to scratch hardness test (pencil method) in accordance with JIS K5600-5-4.

The evaluation criteria were as follows, and the results are shown in Tables 1 and 2.

A: H or harder

B: HB to F

C: B

D: 2B or softer (5) Storage Stability of Ink Jet Composition

The viscosity of each ink jet composition was measured with a digital viscometer VM-100 (manufactured by Yamaichi Electronics) before and after allowing the composition to stand at 50° C. in a sample bottle for one week. The storage stability was rated according to the variation between the viscosities before and after standing. Evaluation criteria are as follows, and the results are shown in Tables 1 and 2.

Criteria:

A: The variation in viscosity was less than 10%.

B: The variation in viscosity was 10% to less than 20%.

C: The variation in viscosity was 20% to less than 25%.

D: The variation in viscosity was 25% or more.

3. 3. Evaluation Results

Tables 1 and 2 show the constituents and their proportions of the radiation-curable ink jet compositions of the Examples, and evaluation results for each composition. As shown in Tables 1 and 2, the radiation-curable ink jet compositions containing monomers A, B, and C with a total content of 10% by mass or more relative to the total mass of the composition had low odor and were good in terms of curability and hardness after being cured.

On the other hand, the composition of Examples 2, 18, 19, and 20, whose total monomer A content was less than 10% by mass relative to the total mass of the composition, were inferior in terms of curability. The composition of Example 20, which did not contain monomer B, had strong odor. The composition of Example 21, which did not contain monomer C, was inferior in terms of flexibility.

4. Experiment 2

The subject matter of the invention will be further described in detail with reference to the following Experiment 2 (including a plurality of Examples). However, the invention is not limited to the Examples.

4. 1. Preparation of Ink Jet Compositions

First, a coloring material, a dispersant, and some or a portion of the monomers were added into a pigment dispersing tank and stirred with ceramic beads of 1 mm in diameter to yield a pigment dispersion liquid in which the coloring material was dispersed in the polymerizable compounds. Then, for preparing each composition shown in Table 3, the rest of the monomers, a polymerization initiator, and a polymerization initiator were added into a stainless steel mixing tank and stirred for mixing. After the ingredients were sufficiently mixed, the pigment dispersion liquid was added, followed by stirring at room temperature for 1 hour. Subsequently, the mixture was filtered through a 5 µm membrane filter. Thus, ink jet compositions of Examples were prepared. The values of ingredients shown in the Table are represented in percent by mass. The proportions in the Table are represented on a mass basis.

TABLE 3

| | | Boiling point (° C.) | Tg (° C.) | Viscosity (mPa·s) | Example 1 | 2 | 3 | 4 | 5 | 6 | 7 | 8 |
|---|---|---|---|---|---|---|---|---|---|---|---|---|
| Monofunctional monomer | PEA | 295 | −22 | 10 | 29 | — | — | — | — | — | — | — |
| | 4-HBA | 298.1 | −32 | 5.5 | — | 29 | — | — | — | — | — | — |
| | ECA | 250 | −67 | 2.9 | — | — | 29 | — | — | — | — | — |
| | MTG | 277.8 | −50 | 5 | — | — | — | 29 | — | — | — | — |
| | 4-t-BCHA | 259.2 | 10 | 9 | — | — | — | — | 29 | — | — | — |
| | CTFA | 363.9 | 27 | 10 | — | — | — | — | — | 29 | — | — |
| | LA | 306.2 | −23 | 4 | — | — | — | — | — | — | 29 | — |
| | TDA | 323 | −40 | 7 | — | — | — | — | — | — | — | 29 |
| | NIPAM | 227.8 | 134 | Solid | — | — | — | — | — | — | — | — |
| | TMCHA | 231 | 52 | 2.7 | — | — | — | — | — | — | — | — |
| | BZA | 228.7 | 6 | 8 | — | — | — | — | — | — | — | — |
| | THFA | 249.4 | −12 | 2.8 | — | — | — | — | — | — | — | — |
| | IOAA | 227.7 | −58 | 2 | — | — | — | — | — | — | — | — |
| | IBXA | 244.5 | 97 | 7.7 | — | — | — | — | — | — | — | — |
| Monomer A | VEEA | 250 | 35 | 3.7 | 20 | 20 | 20 | 20 | 20 | 20 | 20 | 20 |
| Monomer B | ACMO | 296.8 | 145 | 12 | 20 | 20 | 20 | 20 | 20 | 20 | 20 | 20 |
| Monomer C | NVC | 254.7 | 90 | 7 | 15 | 15 | 15 | 15 | 15 | 15 | 15 | 15 |
| Bifunctional urethane acrylate | | | | CN991 | 5.2 | 5.2 | 5.2 | 5.2 | 5.2 | 5.2 | 5.2 | 5.2 |
| Irg. 819 | | | | | 4 | 4 | 4 | 4 | 4 | 4 | 4 | 4 |
| TPO | | | | | 4 | 4 | 4 | 4 | 4 | 4 | 4 | 4 |
| MEHQ | | | | | 0.1 | 0.1 | 0.1 | 0.1 | 0.1 | 0.1 | 0.1 | 0.1 |
| BYK-UV3500 | | | | | 0.5 | 0.5 | 0.5 | 0.5 | 0.5 | 0.5 | 0.5 | 0.5 |
| Carbon black | | | | | 2 | 2 | 2 | 2 | 2 | 2 | 2 | 2 |
| solsperse 36000 | | | | | 0.2 | 0.2 | 0.2 | 0.2 | 0.2 | 0.2 | 0.2 | 0.2 |
| Evaluation | | | | Odor | A | A | B | B | A | A | A | A |
| | | | | Curability | A | A | A | A | A | A | A | A |
| | | | | Flexibility | A | A | A | B | A | A | A | B |
| | | | | Hardness | A | B | B | B | A | A | A | B |
| | | | | Rub fastness of cured film | A | B | B | B | A | A | A | B |
| | | | | Ink viscosity | A | A | A | A | A | A | A | A |

| | | Boiling point (° C.) | Tg (° C.) | Viscosity (mPa·s) | Example 9 | 10 | 11 | 12 | 13 | 14 | 15 | 16 |
|---|---|---|---|---|---|---|---|---|---|---|---|---|
| Monofunctional monomer | PEA | 295 | −22 | 10 | 39 | 39 | 24 | 24 | 24 | 24 | 24 | 24 |
| | 4-HBA | 298.1 | −32 | 5.5 | — | — | — | — | — | — | — | — |
| | ECA | 250 | −67 | 2.9 | — | — | — | — | — | — | — | — |
| | MTG | 277.8 | −50 | 5 | — | — | — | — | — | — | — | — |
| | 4-t-BCHA | 259.2 | 10 | 9 | — | — | — | — | — | — | — | — |
| | CTFA | 363.9 | 27 | 10 | — | — | — | — | — | — | — | — |
| | LA | 306.2 | −23 | 4 | — | — | — | — | — | — | — | — |
| | TDA | 323 | −40 | 7 | — | — | — | — | — | — | — | — |
| | NIPAM | 227.8 | 134 | Solid | — | — | 5 | — | — | — | — | — |
| | TMCHA | 231 | 52 | 2.7 | — | — | — | 5 | — | — | — | — |
| | BZA | 228.7 | 6 | 8 | — | — | — | — | 5 | — | — | — |
| | THFA | 249.4 | −12 | 2.8 | — | — | — | — | — | 5 | — | — |
| | IOAA | 227.7 | −58 | 2 | — | — | — | — | — | — | 5 | — |
| | IBXA | 244.5 | 97 | 7.7 | — | — | — | — | — | — | — | 5 |
| Monomer A | VEEA | 250 | 35 | 3.7 | 10 | 20 | 20 | 20 | 20 | 20 | 20 | 20 |
| Monomer B | ACMO | 296.8 | 145 | 12 | 20 | 10 | 20 | 20 | 20 | 20 | 20 | 20 |
| Monomer C | NVC | 254.7 | 90 | 7 | 15 | 15 | 15 | 15 | 15 | 15 | 15 | 15 |
| Bifunctional urethane acrylate | | | | CN991 | 5.2 | 5.2 | 5.2 | 5.2 | 5.2 | 5.2 | 5.2 | 5.2 |
| Irg. 819 | | | | | 4 | 4 | 4 | 4 | 4 | 4 | 4 | 4 |
| TPO | | | | | 4 | 4 | 4 | 4 | 4 | 4 | 4 | 4 |
| MEHQ | | | | | 0.1 | 0.1 | 0.1 | 0.1 | 0.1 | 0.1 | 0.1 | 0.1 |
| BYK-UV3500 | | | | | 0.5 | 0.5 | 0.5 | 0.5 | 0.5 | 0.5 | 0.5 | 0.5 |
| Carbon black | | | | | 2 | 2 | 2 | 2 | 2 | 2 | 2 | 2 |
| solsperse 36000 | | | | | 0.2 | 0.2 | 0.2 | 0.2 | 0.2 | 0.2 | 0.2 | 0.2 |
| Evaluation | | | | Odor | A | A | B | B | B | B | C | B |
| | | | | Curability | B | A | A | A | A | A | A | A |
| | | | | Flexibility | A | A | A | A | A | A | A | A |
| | | | | Hardness | B | B | A | A | A | A | B | A |
| | | | | Rub fastness of cured film | B | B | A | A | A | A | B | A |
| | | | | Ink viscosity | B | A | B | A | A | A | A | A |

Abbreviations used in the Tables are as follows. Tg of each monomer represents the glass transition temperature of the homopolymer of the monomer.

Polymerizable Compounds

Monomer (A)

VEEA (2-(2-vinyloxyethoxy)ethyl acrylate, produced by Nippon Shokubai)

Monomer (B)

ACMO (acryloylmorpholine, produced by KJ Chemicals)

Monomer (C)

NVC (N-vinylcaprolactam, available from ISP Japan)

Further Monomers (Monofunctional)

PEA (phenoxyethyl acrylate, Biscoat #192 (product name) produced by Osaka Organic Chemical Industry)

4-HBA (4-hydroxybutyl acrylate, produced by Osaka Organic Chemical Industry)

ECA (ethyl carbitol acrylate, produced by Osaka Organic Chemical Industry)

MTG (methoxytriethylene glycol acrylate, Biscoat #MTG (product name) produced by Osaka Organic Chemical industry)

4-t-BCHA (4-tert-butylcyclohexanol acrylate)

CTFA (cyclic trimethylolpropane triacrylate, produced by Osaka Organic Chemical Industry)

LA (lauryl acrylate, produced by Osaka Organic Chemical Industry)

TDA (tridecyl acrylate)

NIPAM (isopropylacrylamide, produced by KJ Chemicals, solid at room temperature)

TMCHA (3,3,5-trimethylcyclohexyl acrylate, produced by Sartomer)

BZA (benzyl acrylate, produced by Osaka Organic Chemical Industry)

THFA (tetrahydrofurfuryl acrylate, V #150 (product name) produced by Osaka Organic Chemical Industry)

IOAA (isooctyl acrylate)

IBXA (isobornyl acrylate, produced by Osaka Organic Chemical Industry)

Further Monomer (Multifunctional)

CN991 (bifunctional urethane acrylate oligomer, produced by Sartomer)

Photopolymerization Initiators

Irq. 819 (bis(2,4,6-trimethylbenzoyl)phenylphosphine oxide, IRGACURE 819 (product name) produced by BASF)

TPO (2,4,6-trimethylbenzoyldiphenylphosphine oxide, IRGACURE TPO (product name) produced by BASF)

Polymerization Inhibitor

MEHQ (hydroquinone monomethyl ether, p-Methoxyphenol (product name) produced by Kanto Chemical)

Slipping Agent

BYK-UV3500 (product name of BYK Additives & Instruments, acryloyl group-containing polyether-modified polydimethylsiloxane)

Coloring Material

Carbon black (MA-100 (product name) produced by Mitsubishi Chemical)

Dispersant

Solsperse 36000 (product name of Lubrizol, polymer dispersant)

4. 2. Evaluation (1) Odor of Ink Jet Compositions

Each ink jet composition was smelled immediate after being prepared and was evaluated according to the following criteria. The results are shown in Table 3.

Criteria:
A: Odorless
B: So weak as barely sensed
C: Weak odor to the extent that it was recognized what smell it was
D: So strong as easily sensed (2) Curability Each ink jet composition was printed and cured in the following manner. First, a PET film with a receiving layer (Ester Film E5000 (125 μm in thickness, manufactured by Toyobo) stuck on the table of a transport unit configured to linearly transport a test sample was transported. During the transport, the ink jet composition was ejected from an ink jet head onto the PET film, and the printed sample was passed under an irradiation device to be irradiated with light. The degree of curing at that time was examined by finger touch. The composition was printed at a rate of 14 ng/dot with resolutions of 720 dpi×720 dpi. The irradiation intensity at the print surface was 1 W/cm$^2$. The printed sample size was 1 inch×1 inch. The irradiation energy was adjusted by varying the transport speed of the sample. Each ink jet composition was irradiated with UV light having an emission peak wavelength of 395 nm. The irradiation energy (mJ/cm$^2$) required for curing the composition was measured. More specifically, the energy of irradiation with UV light required for curing was determined by measuring the total light quantity with an integrating actinometer UM-40 (manufactured by Konica Minolta) when the printed solid pattern was irradiated until the stickiness on fingers of the solid pattern was lost. The temperature of the PET film, or printing medium, was 40° C. during printing and curing. The evaluation criteria were as follows, and the results are shown in Table 3.

A: Total light quantity was 200 mJ/cm$^2$ or less.
B: Total light quantity was more than 200 mJ/cm$^2$ to 350 mJ/cm$^2$.
C: Total light quantity was more than 350 mJ/cm$^2$ to 500 mJ/cm$^2$.
D: Total light quantity was more than 500 mJ/cm$^2$.

(3) Flexibility

Each composition was applied to a thickness of 10 μm onto a polyvinyl chloride film (JT 5829R manufactured by MACtac) with a bar coater. The coating of the composition was then cured at an energy of 400 mJ/cm$^2$ by using a metal halide lamp (manufactured by iGrafx). The release paper of the polyvinyl chloride film having the cured coating was removed, and the film was cut into a rectangular piece of 1 cm in width and 8 cm in length to yield a test sample. The elongation, or stretchability, of each test sample of the compositions was measured with a tensile tester (TENSILON, manufactured by ORIENTEC). The elongation was determined as the value at which the test sample cracked. The samples were evaluated according to the following criteria, and the results are shown in Table 3.

A: 120% or more
B: 80% to less than 120%
C: 40% to less than 80%
D: Less than 40%

(4) Hardness

The same films as those prepared for evaluating the curability were subjected to scratch hardness test (pencil method) in accordance with JIS K5600-5-4. The evaluation criteria were as follows, and the results are shown in Table 3.

A: F or harder
B: B to softer than F
C: 4B to softer than B
D: softer than 4B (5) Rub Fastness Eight micrometer-thick coatings were formed by printing the same sold pattern as that formed for evaluating curability and curing the pattern. The rub fastness of the cured coatings was examined with a Gakushin-type rubbing tester (manufactured by TESTER SANGYO) in accordance with JIS K 5701 (ISO 11628) (specifying the testing methods for lithographic inks, diluted ink samples, and prints). For examining rub fastness, a load of 500 g was applied to the coating with a high-quality paper sheet placed on the coating, and the coating was rubbed. The state of the rubbed coating was visually observed, and the evaluation criteria were as follows:

A: There were no dirt on the high-quality paper and no separation or scratches at the print surface.

B: There was some dirt on the high-quality paper, but no separation or scratches at the print surface.

C: There were some dirt on the high-quality paper, and separation or scratches were observed at the print surface.

D: There were some dirt on the high-quality paper and separation at the print surface.

(6) Viscosity of Ink Jet Compositions

The viscosity of each ink jet composition of the Examples was measured. More specifically, the viscosity of each ink jet composition was measured one hour after preparing the ink jet composition, with a vibration viscometer MV 100 (manufactured by Yamaichi Electronics). The measurements were rated according to the following criteria, and the results are shown in Table 3. The measurement temperature was 20° C.

A: less than 20 mPa·s

B: 20 mPa·s to less than 30 mPa·s

C: 30 mPa·s or more 4. 3. Evaluation Results

Table 3 shows the constituents and their proportions of the radiation-curable ink jet compositions of the Examples, and evaluation results for each composition. As shown in Table 3, the radiation-curable ink jet compositions containing monomers A, B, and C with a total content of 10% by mass or more relative to the total mass of the composition had low odor and were good in terms of curability and hardness after being cured.

The invention is not limited to the above-described embodiments, and various modifications may be made. For example, the invention includes substantially the same form as the disclosed embodiments (for example, a form including the same function and method and producing the same result, or a form having the same purpose and producing the same effect). Some elements unessential to the form of the disclosed embodiment may be replaced. The form of an embodiment of the invention includes an element producing the same effect or achieving the same object, as the form of the disclosed embodiments. The forms of the disclosed embodiments may be combined with the known art.

The entire disclosures of Japanese Patent Application Nos. 2016-128884 filed Jun. 29, 2016 and 2017-075087 filed Apr. 5, 2017 are expressly incorporated by reference herein.

What is claimed is:

1. A non-aqueous radiation-curable ink jet composition, comprising:
at least one monomer A represented by the following general formula (I): $CH_2=CR^1-COOR^2-O-CH=CH-R^3$, wherein $R^1$ represents a hydrogen atom or a methyl group, $R^2$ represents a divalent organic moiety having a carbon number of 2 to 20, and $R^3$ represents a hydrogen atom or a monovalent organic moiety having a carbon number of 1 to 11;
a monomer B having one of a cyclic, a linear, and a branched structure and containing a (meth)acryloyloxy or (meth)acryloyl group and nitrogen, wherein the total number of nitrogen atoms and oxygen atoms other than the oxygen atoms contained in the (meth)acryloyloxy or (meth)acryloyl group is at least 2;
at least one monomer C represented by the following general formula (II):

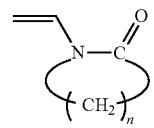

wherein n represents an integer in the range of 2 to 6; and
a photopolymerization initiator,
wherein the monomer A, the monomer B, and the monomer C constitute a medium of the ink jet composition in which the photopolymerization initiator is dissolved or dispersed;
the total content of monomer A is 10% by mass or more relative to the total mass of the ink jet composition; and
the monomer B is at least one selected from the group consisting of hydroxyethyl methacrylamide and dimethylaminopropyl acrylamide (DMAPAA).

2. The radiation-curable ink jet composition according to claim 1, wherein the total content of monomer C is 23% by mass or less relative to the total mass of the ink jet composition.

3. The radiation-curable ink jet composition according to claim 1, wherein the total content of monomer A is 25% by mass or less relative to the total mass of the ink jet composition.

4. The radiation-curable ink jet composition according to claim 1, wherein the total content of monomer C is 5% by mass or more relative to the total mass of the ink jet composition.

5. The radiation-curable ink jet composition according to claim 1, wherein the total content of monomer C is in the range of 10% by mass to 25% by mass relative to the total mass of the ink jet composition.

6. An ink jet printing method comprising:
applying the radiation-curable ink jet composition as set forth in claim 1 onto a printing medium; and
irradiating the radiation-curable ink jet composition with light from an ultraviolet light emitting diode.

7. An ink jet printing method comprising:
applying the radiation-curable ink jet composition as set forth in claim 2 onto a printing medium; and
irradiating the radiation-curable ink jet composition with light from an ultraviolet light emitting diode.

8. An ink jet printing method comprising:
applying the radiation-curable ink jet composition as set forth in claim 3 onto a printing medium; and
irradiating the radiation-curable ink jet composition with light from an ultraviolet light emitting diode.

9. An ink jet printing method comprising:
applying the radiation-curable ink jet composition as set forth in claim 4 onto a printing medium; and
irradiating the radiation-curable ink jet composition with light from an ultraviolet light emitting diode.

10. An ink jet printing method comprising:
applying the radiation-curable ink jet composition as set forth in claim 5 onto a printing medium; and
irradiating the radiation-curable ink jet composition with light from an ultraviolet light emitting diode.

11. The ink jet printing method according to claim 6, wherein the irradiation energy of the ultraviolet light emitting diode is 50 mJ/cm$^2$ to 1000 mJ/cm$^2$.

12. The ink jet printing method according to claim 6, wherein the irradiation intensity of the ultraviolet light emitting diode is 10 mW/cm$^2$ to 1000 mW/cm$^2$.

13. The ink jet printing method according to claim 6, wherein the printing medium onto which the ink jet composition is applied has a temperature of less than 45° C.

* * * * *